US008882080B2

(12) United States Patent
Tiberghien et al.

(10) Patent No.: US 8,882,080 B2
(45) Date of Patent: Nov. 11, 2014

(54) CONNECTING DEVICE WITH LOCKING BY THREADED CLAWS AND CONNECTOR COMPRISING SUCH A DEVICE

(75) Inventors: Alain-Christophe Tiberghien, Sevrier (FR); Christophe Durieux, Gilly sur Isere (FR)

(73) Assignee: Staubli Faverges, Faverges (FR)

( * ) Notice: Subject to any disclaimer, the term of this patent is extended or adjusted under 35 U.S.C. 154(b) by 197 days.

(21) Appl. No.: 13/267,961

(22) Filed: Oct. 7, 2011

(65) Prior Publication Data

US 2012/0086202 A1    Apr. 12, 2012

(30) Foreign Application Priority Data

Oct. 8, 2010    (FR) ...................................... 10 58184

(51) Int. Cl.
| *F16L 37/28* | (2006.01) |
| *F16L 37/138* | (2006.01) |
| *F16L 37/12* | (2006.01) |
| *F16L 37/42* | (2006.01) |

(52) U.S. Cl.
CPC ........... *F16L 37/138* (2013.01); *F16L 37/1215* (2013.01); *F16L 37/42* (2013.01)
USPC .................. 251/149.6; 251/149.4; 251/149.1; 251/149.9

(58) Field of Classification Search
USPC .......... 251/149.1, 149.3, 149.4, 149.6, 149.9; 137/614, 614.01–614.06
See application file for complete search history.

(56) References Cited

U.S. PATENT DOCUMENTS

| 4,681,350 | A | * | 7/1987 | Gaita ............................. 285/316 |
| 5,080,132 | A | * | 1/1992 | Manz et al. ............. 137/614.04 |
| 5,740,835 | A | * | 4/1998 | Murphy ................... 137/614.05 |
| 6,283,151 | B1 | * | 9/2001 | Countryman et al. ... 137/614.04 |
| 6,283,443 | B1 | * | 9/2001 | Taneya ........................ 251/149.6 |
| 7,926,783 | B1 | * | 4/2011 | Liu ............................ 251/149.6 |

* cited by examiner

*Primary Examiner* — Stephen M Hepperle
*Assistant Examiner* — Hailey K Do
(74) *Attorney, Agent, or Firm* — Dowell & Dowell, PC (57) ABSTRACT

A connecting device adapted to transmit pressurized gaseous and/or liquid fluids, configured to be coupled with a connecting end provided with an engaging profile and wherein the connecting device includes a tubular body that extends along a longitudinal axis between a front side facing the connecting end in the coupled configuration and a rear side facing opposite the connecting end, a control member that slides relative to the tubular body along the longitudinal axis and at least one coupling member positioned between the tubular body and the control member and including an engaging profile complementary to the engaging profile of the connecting end, and elastically deformable means that push the control member back toward the front side in a maintenance position of the at least one coupling member locked on the connecting end. The connecting device also includes elastically deformable means that push the coupling member back toward the rear side in a position where an axial play is defined between the at least one coupling member and the tubular body thereby allowing an axial movement of the at least one coupling member, relative to the tubular body and against the elastically deformable means acting on the at least one coupling member, toward a position locked on the connecting end.

14 Claims, 7 Drawing Sheets

CONNECTING DEVICE WITH LOCKING BY THREADED CLAWS AND CONNECTOR COMPRISING SUCH A DEVICE

BACKGROUND OF THE INVENTION

1. Field of the Invention

The present invention relates to a connecting device. The field of the invention is that of connectors provided for "high pressure" applications, such as the removable junction of pipes in which gaseous and/or liquid fluids circulate with a pressure in the vicinity of 10 to 250 bars.

2. Brief Description of the Related Art

EP-A-0 804 701 describes a connecting device, comprising a tubular body and an outer sleeve sliding relative to the body. Jaws equip the body, from which they can be radially spaced apart to connect a male connecting element to which the device must be connected. The jaws and the male connecting element are each provided with an engaging profile, complementary to each other, including threading elements. A sealing piston, slidingly mounted at the center of the body, is intended to be pressed against the male connecting element. A sliding ring, which can be moved axially independently and spring loaded, is arranged between the sealing piston and the jaws. This sliding ring can be engaged with the jaws, in the uncoupled configuration of the device, to keep them in the open position. Also, the sliding ring is mounted so as to be movable, during coupling, together with the sealing piston, to release the jaws and allow them to be engaged on the male connecting element.

Such a device has an insufficient reliability. More precisely, the locking of the complementary engaging profiles of the jaws and the male connecting element is uncertain. In fact, depending on the angular orientation of the connector inserted between the jaws, abutting against the piston, which in turn is abutting against the body, it happens that the threads of the opposite profiles are axially offset, which causes incomplete closing of the jaws that cannot be covered by the outer sleeve for locking thereof. If the threads of the jaws rest near the apex of threads of the male connecting element, on the side of the threads facing its mouth, this male connecting element is pushed back by the piston and moves axially until complete meshing of the threads and covering of the jaws by the sliding outer sleeve. However, if the threads of the jaws rest near the thread apex of the male connecting element, on the side of the threads opposite its mouth, then the engaging profiles have no possibility of relative movement in the direction of complete locking of the jaws. In this case, the jaws are in contact with the body, while the male connecting element abuts on the body via the sealing piston. The jaws are therefore insufficiently locked, ejected and the male element is pushed back by the piston once the operator releases the outer locking sleeve of the device. Thus, in "high pressure" applications, such a device poses a significant safety problem for the operator.

SUMMARY OF THE INVENTION

The aim of the present invention is therefore to propose a connecting device adapted to perform an automatic connection with threaded claws, while improving the operator's safety and the reliability of the connection.

To that end, the invention relates to a connecting device adapted to transmit pressurized gaseous and/or liquid fluids, this connecting device being configured to be coupled with a connecting end provided with an engaging profile, with a first element among the connecting device and the connecting end that is configured as a male element and a second element among the connecting device and the connecting end that is configured as a female element, the connecting device comprising:
  a tubular body that extends along a longitudinal axis between a front side facing the connecting end in the coupled configuration and a rear side facing opposite the connecting end in the coupled configuration,
  a control member able to slide relative to the tubular body along the longitudinal axis,
  at least one coupling member that is positioned between the body and the control member and that includes an engaging profile complementary to the engaging profile of the connecting end, and
  elastically deformable means able to push the control member back toward the front side in a maintenance position of each coupling member locked on the connecting end,
the connecting device wherein also comprises elastically deformable means able to push the coupling member back toward the rear side in a position where an axial play is defined between each coupling member and the body, this axial play allowing an axial movement of each coupling member, relative to the body and against the elastically deformable means acting on the coupling member, toward a position locked on the connecting end.

Thus, the male and female connecting elements can be connected automatically and safely for the operator. The or each coupling member is axially mobile owing to the presence of the axial play. As a result, the actuation of the connecting device from the uncoupled configuration toward the coupling configuration is done by ensuring an optimal interaction between the complementary engaging profiles, which are in particular threads. The elastically deformable means, i.e. one or more springs, are arranged in the connecting device so as to act on the one hand on the control member and on the other hand on the coupling member. In practice, the axial retrofit of the claws greatly reduces the risk of locking between complementary threads, which can cause the connection to break and put the operator and the high-pressure installation at risk.

According to other advantageous features of the invention, considered alone or in combination:
  the engaging profile of each coupling member and the engaging profile of the connecting end are complementary threads and tappings, which have an identical apical angle and thread pitch, and the axial play is greater than or equal to the half-pitch of the threads and tappings;
  the connecting device has a contact interface between the control member and each coupling member, this contact interface being inclined relative to the longitudinal axis;
  the contact interface is defined by a tapered surface of the control member that defines an incline angle relative to the longitudinal axis in a plane including said longitudinal axis, and said incline angle is smaller than or equal to the apical angle of the threads;
  the connecting device has a contact interface between the control member and each coupling member, this contact interface being inclined relative to the longitudinal axis, the contact interface defines an incline angle relative to the longitudinal axis in a plane including said longitudinal axis, and said incline angle is smaller than or equal to the apical angle of the threads;
  each coupling member has an elastically deformable part, each deformable part being configured to radially move the engaging profile of the coupling member by deforming;

the coupling member comprises several claws distributed radially around the longitudinal axis and connected to a substantially annular shared base;

the coupling member cooperates with the body via a base arranged in a housing of the body, the axial play being defined between this base and this housing;

the connecting device also has a piston sliding in the body, a first end of said piston forms a valve elastically returned on a valve seat formed on the body and a second end of said piston forms an elastic stop able to receive the connecting end bearing axially and to produce sealing between the connecting end and the connecting device;

the elastically deformable means comprise a single spring arranged between the control member and the coupling member, this spring being able, on the one hand, to push the control member back toward the front side toward the maintenance position of each coupling member locked on the connecting end and, on the other hand, to push the coupling member back toward the rear side toward the position where the axial play is defined between each coupling member and the body. Alternatively, these elastically deformable means comprise, on the one hand, a first spring arranged between the body and the control member and able to push the control member back forward and, on the other hand, a second spring arranged between the body and the coupling member and able to push the coupling member back toward the rear.

According to a first alternative, the connecting device is configured as a female element adapted to receive a male connecting end, and the control member is an annular ring able to slide outside the body.

According to another alternative, the connecting device is configured as a male element adapted to cooperate with a female connecting end, and the control member is arranged inside the body and comprises, on the one hand, an annular ring configured to cooperate with the coupling member and, on the other hand, a shaft that is connected to the annular ring and which is configured to slide axially under the action of a lever arranged in the body.

The invention also relates to a connector adapted to transmit gaseous and/or liquid fluids at high pressure. This connector comprises a connecting device as mentioned above and connected to a first pipe, and a connecting end that is coupled to the connecting device and connected to a second pipe.

BRIEF DESCRIPTION OF THE DRAWINGS

The invention will be better understood upon reading the following description, provided solely as a non-limiting example and done in reference to the drawings, in which:

FIGS. 1 to 7 show a first embodiment of a connector R10 comprising a connecting device 10.

DESCRIPTION OF THE PREFERRED EMBODIMENTS

This device 10 is configured as a female element, adapted to receive a male connecting end 2. The device 10 and the end 2 are the two component elements of the connector R10, adapted to transmit the high-pressure gaseous and/or liquid fluids. In that case, the device 10 is connected to a first pipe, while the connecting end 2 is coupled to the connecting device 10 and connected to a second pipe, these pipes not being shown in FIGS. 1 to 7.

The device 10 extends along a longitudinal axis X10 between a first side 11 opposite the end 2 in the coupled or coupling configuration and a second side 12 facing the end 2 in the coupled or coupling configuration. The sides 11 and 12 define a first direction D1 facing the side 11 from the side 12 and a second direction D2 oriented in the opposite direction. The directions D1 and D2 are parallel to the axis X10. The side 11 can be qualified as the rear side of the device 10, while the side 12 is the front side.

Figures 6, 7:
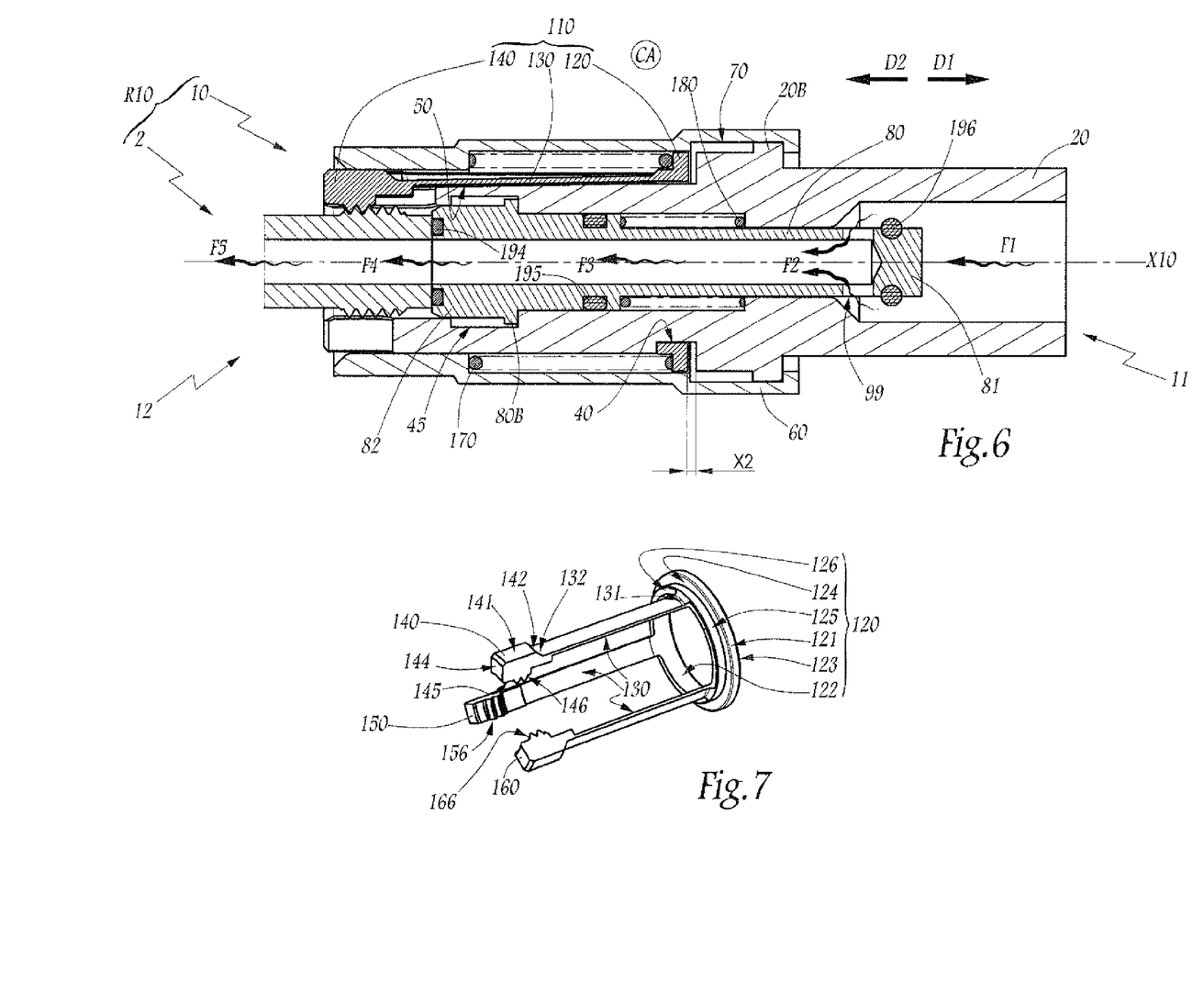
FIG. 6 is a cross-section similar to FIGS. 1 and 4, showing the male end and the connecting device in a coupled configuration.
FIG. 7 is a perspective view of a coupling member provided with claws and belonging to the connecting device of FIGS. 1 to 6.

The device 10 comprises a body 20, a control member 60 and an inner piston 80 sliding relative to each other along the axis X10. The device 10 also comprises a single-piece coupling member 110 provided with three claws 140, 150 and 160, each being connected to an annular base 120 shared by a deformable part 130 specific to it, as shown in FIG. 7. The elements 20, 60, 80 and 110 each have a substantially tubular profile centered on the axis X10, including the fact that the member 110 is provided with three claws regularly distributed around said axis.

In practice, the claws 140, 150 and 160 jointly have an engaging profile complementary to an engaging profile of the male end 2, adapted to produce the coupling between, on the one hand, the device 10 and, on the other hand, the male end 2.

Said male end 2, centered on the axis X10 of the device 10 on the side 12 before the coupling, has an outer cylindrical surface 4 that extends along the axis X10 and is provided with a threaded part 6. More specifically, this threaded part 6 has an ISO metric thread centered on the axis X10, with a symmetrical profile with an apical angle $\theta 6$ equal to $60°$ and a pitch P, as detailed later relative to FIG. 5. The end 2 also has an end surface 8 perpendicular to the surface 4. As emerges from the following explanations, the part 6 constitutes an engaging profile for the end 2.

Figure 2:
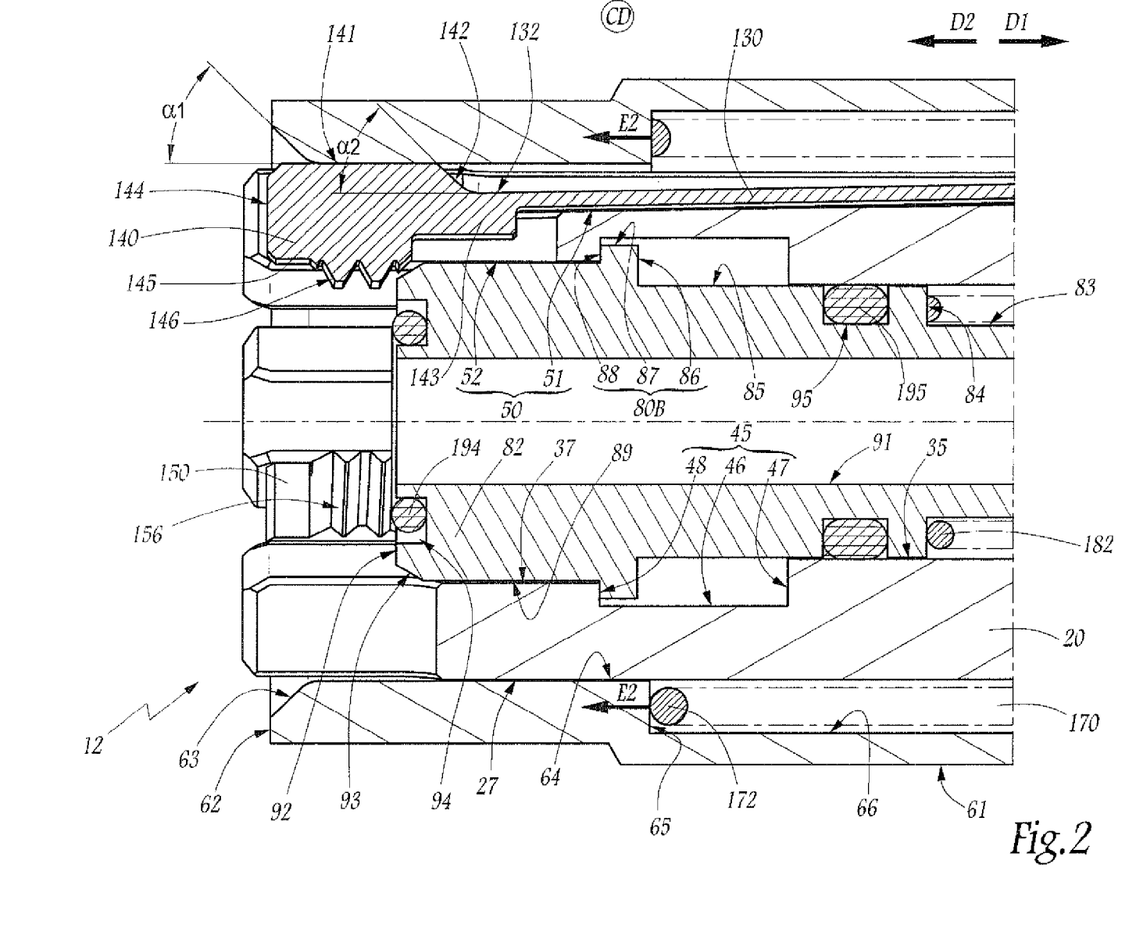
FIGS. 2 and 3 are larger-scale views, respectively of detail II and detail III of FIG. 1.
Figure 3:
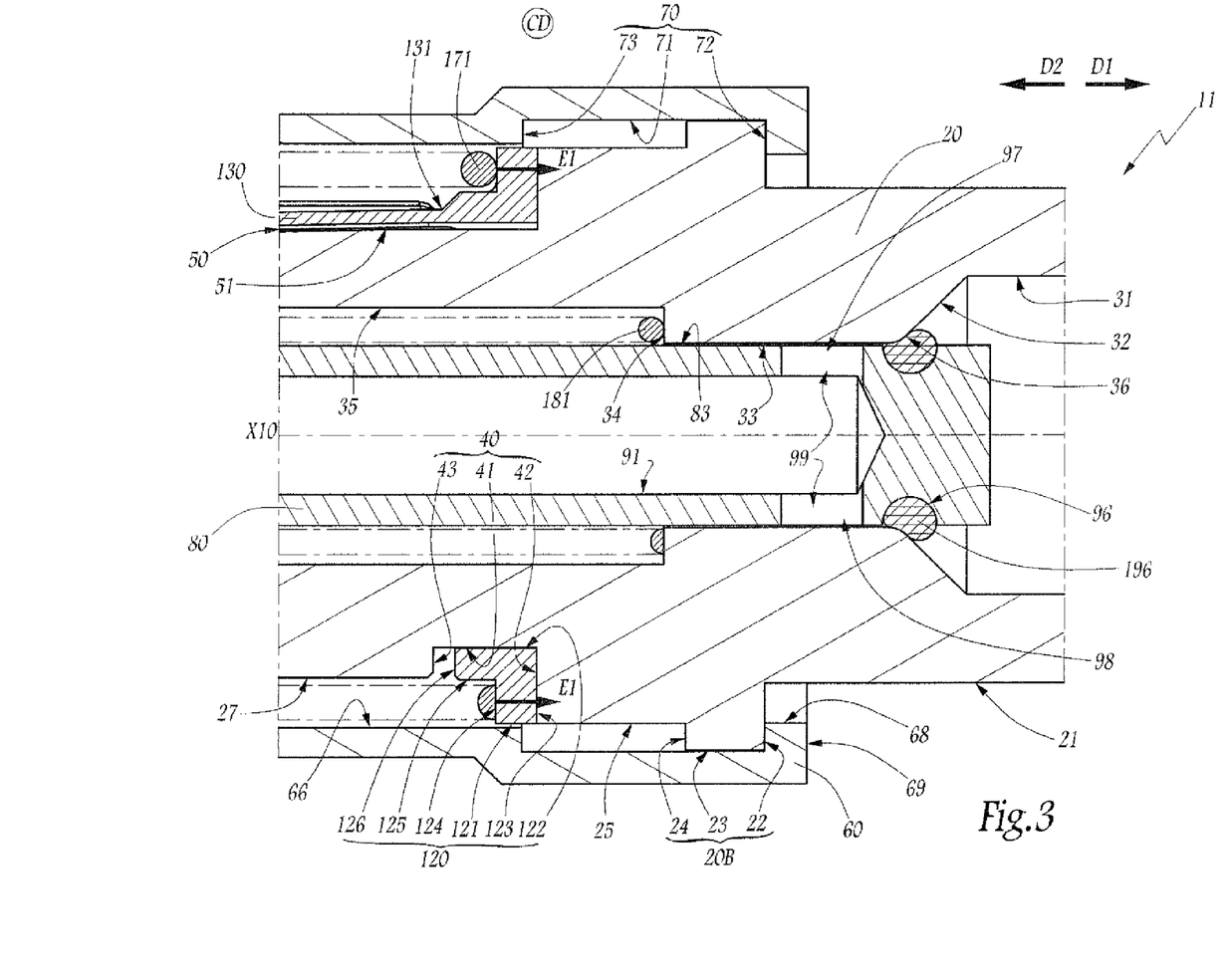

As shown in FIGS. 2 and 3, the tubular body 20 extends along the longitudinal axis X10 between the front side 12 facing the end 2 in the coupled configuration CA and the rear side 11 facing opposite the end 2 in the coupled configuration CA. More specifically, the body 20 has outer cylindrical surfaces 21, 23, 25 and 27, as well as inner cylindrical surfaces or bores 31, 33, 35 and 37, which are coaxial and centered on the longitudinal axis X10. A radial annular surface 22 extends between the surfaces 21 and 23, while a radial annular surface 24 extends between the surfaces 23 and 25, perpendicular to the axis X10. The surfaces 22, 23 and 24 define a shoulder 20B protruding radially outwardly from the body 20.

A tapered surface 32, inclined at 45° relative to the axis X10, connects the surfaces 31 and 33, with a rounded edge 36 defined between the surfaces 32 and 33. Alternatively, this surface 32 can be inclined by a different angle, preferably between 30 and 60°.

An annular surface 34 extends radially between the surfaces 33 and 35. An annular surface 38 radially connects the surfaces 21 and 31 on side 11.

In practice, the device 10 is configured so that a flow F1 of pressurized gaseous and/or liquid fluid penetrates the bore 31 of the body 20 on side 11, in direction D2.

Furthermore, a first groove segment 40, oriented opposite the axis X10, i.e. formed on the outside of the body 20, is formed between the surfaces 25 and 27 of the body 20, as shown in FIG. 3. More precisely, this groove segment forms a housing 40 with a cylindrical bottom surface 41 connected to the surface 25 by a radial surface 42 and connected to the surface 27 by a radial surface 43. An annular groove 45, oriented toward the axis X10, i.e. formed on the inside of the body 20, is formed between the surfaces 35 and 37, as shown in FIG. 2. More precisely, the groove 45 has a cylindrical surface 46 connected to the surface 35 by a radial surface 47 and connected to the surface 37 by a radial surface 48.

Furthermore, the body 20 comprises several longitudinal grooves 50, each including a wide portion 52 passing radially through the body 20 and provided to receive one of the claws 140, 150 or 160, as well as an elongate portion 51 formed on the outer surface 27 and provided to receive the corresponding elongate portion 130. Each groove 50 extends, in the body 20 and in direction D2, from the housing 40 until it emerges in the side 12 of the body 20.

In practice, the control member 60 is a ring outside the body 20. This ring 60 has a stepped outer surface 61 centered on the axis X10, provided for the user to handle the device 10. The ring 60 is provided with several bores 64, 66 and 68. A radial surface 62 extends from the surface 61 toward the axis X10 on the side 12 and is connected to the bore 64 by a tapered surface 63. More precisely, the surface 63 is oriented toward the side 12 and inclined relative to the axis X10 by an angle α1 that is equal to 45°. A radial surface 65 connects the surfaces 64 and 66, while a radial end surface 69 connects the surfaces 61 and 68.

In an alternative that is not shown, the angle α1 can be between 15° and 60°.

An annular groove 70, facing the axis X10, i.e. formed on the inside of the ring 60, is formed between the surfaces 66 and 68. More specifically, the ring 70 is defined by a bore 71 that defines its bottom and that is connected to the surface 66 by a radial surface 73 and connected to the surface 68 by a radial surface 72. In practice, this groove 70 is configured to receive the shoulder 20B of the body 20: the surface 23 slides in the bore 71, the surface 22 can abut against the surface 72 in direction D1, while the surface 24 can abut against the surface 73 in direction D2.

The piston 80 has a first end 81 formed in a valve on side 11 and a second end 82 formed as an elastic stop on side 12, provided to receive in support the surface 8 of the male end 2. The piston 80 has outer cylindrical surfaces 83, 85, 87 and 89 that extend around the axis X10. A radial surface 84 connects the surfaces 83 and 85, a radial surface 86 connects the surfaces 85 and 87 and a radial surface 88 connects the surfaces 87 and 89. As shown in FIG. 2, the surfaces 86, 87 and 88 form a shoulder 80B radially protruding outwardly from the piston 80.

A spring 180 is arranged between the body 20 and the piston 80, with a first end 181 bearing against the surface 34 and a second end 182 bearing against the surface 84.

The piston 80 can therefore slide axially in the body 20, with the shoulder 80B that abuts in the groove 45. More precisely, the cylindrical surface 85 slides in the bore 35. The surface 86 can abut against the surface 47 under the thrust of the end 2 on the end 82 in direction D1, while the surface 88 can abut against the surface 48 under the action of the spring 180 in direction D2.

The piston 80 also has, on the side of the end 82, an annular radial surface 92 that is connected to the surface 89 by an inclined tapered surface 93. An annular groove 94 is formed in the end 82 on the surface 92 and configured to receive an O-ring 194. An annular groove 95 is formed in the piston 80 from the surface 85 and configured to receive an O-ring seal 195 between the surfaces 85 and 35. An annular groove 96, with a rounded concave shape, is formed at the end 81 from the surface 83 and configured to receive an O-ring 196.

Moreover, the piston 80 has a bore 91 centered on the axis X10, which emerges at the end 82 and does not emerge at the end 81. As shown in FIG. 3, the piston 80 is diametrically passed through by a cylindrical bore 99, which passes through the axial bore 91 and emerges on either side of the surface 83, thereby forming two cylindrical openings 97 and 98 between the bore 91 and the outside of the piston 80. The openings 97 and 98 are provided for the entry of the fluid flow F1 in the bore 91 when the piston 80 is moved in direction D1 and axially offset from its seat formed by the edge 36.

In fact, when the piston 80 is moved maximally in direction D2 under the action of the spring 180, the O-ring 196 is pressed against the edge 96 and prevents the flow of pressurized fluid from the bore 31 to the bore 91. On the other hand, when the piston 80 is moved in direction D1, i.e. when the surface 8 of the male end 2 bears on the end 82 of the piston 80 and moves it, the ring 196 is no longer pressed on the edge 36 and the flow F1 flows freely in the bore 91 through the openings 97 and 98 of the bore 99. In that case, the sealing rings 194 and 195 perform the sealing of the device 10.

Figure 4:
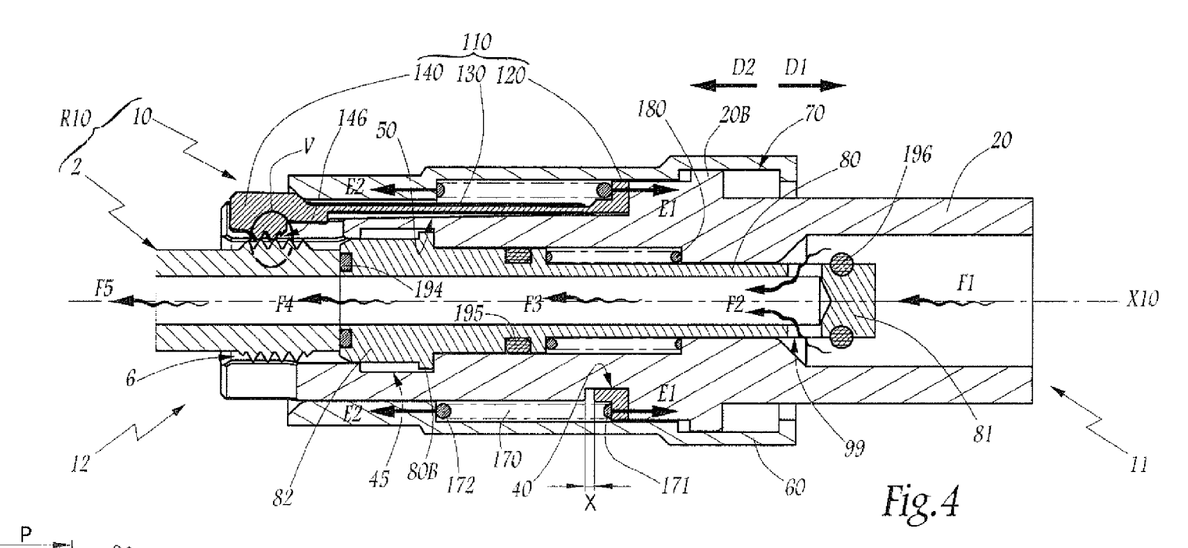
FIG. 4 is a cross-section similar to FIG. 1, showing the male end and the connecting device during coupling.
Figure 5:
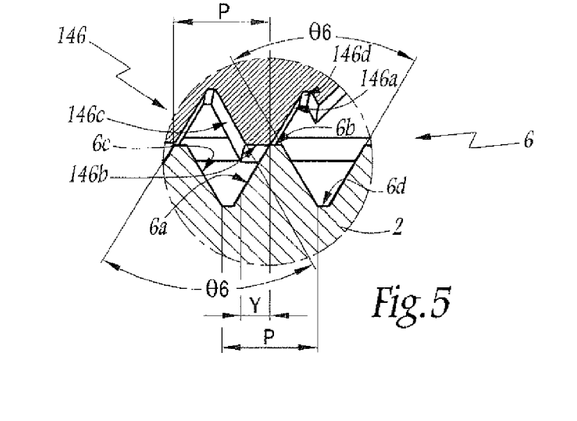
FIG. 5 is a larger-scale view of detail V in FIG. 4, showing the complementary threads of the male end and the connecting device.

Thus, as shown in FIGS. 4 and 5, the flow of fluid F1 arrives in the device 10 through the inside of the bore 31, penetrates the piston 80 through openings 97 and 98 in the form of a flow F2, passes through the piston inside the bore 91 in the form of a flow F3, goes from the device 10 to the end 2 at the end 82 in the form of a flow F4, and continues to flow in the end 2 in the form of a flow F5.

As shown in FIG. 3, the annular base 120 of the coupling member 110 has a cylindrical outer surface 121, a bore 122, and a second cylindrical outer surface 125 whereof the diameter is intermediate relative to the diameters of the surfaces 121 and 122. The annular base 120 also has a radial surface 123 that connects the surfaces 122 and 121 on the side 11. Lastly, the annular base 120 has a radial surface 124 that connects the surfaces 121 and 125 and a radial surface 126 that connects the surfaces 122 and 125, on side 12.

In practice, the annular base 120 is housed in the housing 40 of the body 20. Elastically deformable means, such as a spring 170, are arranged between the ring 60 and the coupling member 110. More specifically, this spring 170 has a first end 171 bearing against the surface 124 of the annular base 120 and a second end 172 of the spring 170 bearing against the surface 65.

In the uncoupled configuration CD of the device 10, the spring 170 pushes the surface 123 back on the rear in direction D1, against the surface 42. The axial length, measured parallel to the axis X10, of the bore 122 is strictly smaller than the axial length of the surface 41 that forms the bottom of the housing 40. Thus, an axial play X is defined between the coupling member 110 and the body 20. More specifically, this axial play X is defined on the front between the surface 126 and the surface 43 when the spring 170 presses the surfaces 123 and 42 against each other. This axial play X allows, during coupling, a forward axial movement of the coupling member 110 toward a position locked on the end 2, in which the coupling member 110 is kept engaged on the connecting end 2.

In an alternative that is not shown, the axial play X is defined following a different construction from that described above and illustrated in FIGS. 1 to 7. In other words, in that case the play X is not defined at the annular base 120, and the member 110 cooperates with the body 20 using different means. For example, this cooperation can occur at the deformable part 130, with a radial protrusion of said part 130 that is arranged in a housing, similar to the housing 40, of the body 20. According to another example, corresponding to an opposite construction relative to that shown in FIGS. 1 to 7, the member 110 can be provided with a housing in which is positioned, with axial play, a radial protrusion of the body 20. The axial play X corresponding to the difference in the axial lengths between the housing and the radial protrusion is then situated on the rear of said radial protrusion and allows, during coupling, a forward axial movement of the coupling member 110 toward its locked position engaged on the connecting end 2.

As mentioned above, each deformable part 130 of the member 110 is housed and therefore laterally guided in a groove 50. More specifically, each deformable part 130 extends axially from the annular base 120 at a first end 131, and is attached to the claws 140, 150 and 160 at a second end 132.

Only the claw 140 is described in detail below, claws 150 and 160 having an identical construction.

The claw 140 has a cylindrical outer surface 141, which can slide in the bore 64 of the ring 60. A tapered surface 142 connects the surface 141 to the end 132 of the deformable part 130. Said surface 142 is oriented on side 11 and inclined by an angle α2 relative to the axis X10. The incline angle α2 of the surface 142 is defined as a function of the incline angle α1 of the surface 63, to allow the surfaces 63 and 142 to cooperate and transmit axial and radial forces between the ring 60 and the claw 140. Preferably, the angles α1 and α2 are equal to each other and equal to 45°. A contact interface 60/140 is defined between the ring 60 and the claw 140, said interface 60/140 corresponding to the sliding surface between the ring 60 and the claw 140, which is therefore inclined by angle α1 or α2. Thus, when the surface 63 of the ring 60, pushed back by the spring 170 in direction D2, slides on the surface 142, the ring 60 can move the claw 140, on the one hand, axially in direction D2 by making the annular base 120 slide into the housing 40 against the spring 170 and, on the other hand, radially by deforming the part 130 toward the axis X10.

In an alternative that is not shown, only one element among the ring 60 and the claw 140 has an inclined surface 63 or 142. In practice, in this case as well, the ring 60 can axially and radially move the claw 140. The contact interface 60/140 is defined by the surface 63 or 142 that is inclined, on which the sliding between the elements 60 and 140 occurs.

Furthermore, a strengthened part 143, with an increased radial thickness, is provided between the end 132 and the claw 140 so as to strengthen the connection between the claw 140 and the deformable part 130 when the surface 63 bears on the surface 142. In particular, this part 143 is housed in the widened part 52 of the groove 50.

The claw 140 also has an annular radial end surface 144 that connects the surface 141 to an inner surface 145 of the claw 140, facing the axis X10. This surface 145 has an engaging profile configured as a tapping portion 146.

Figure 1:
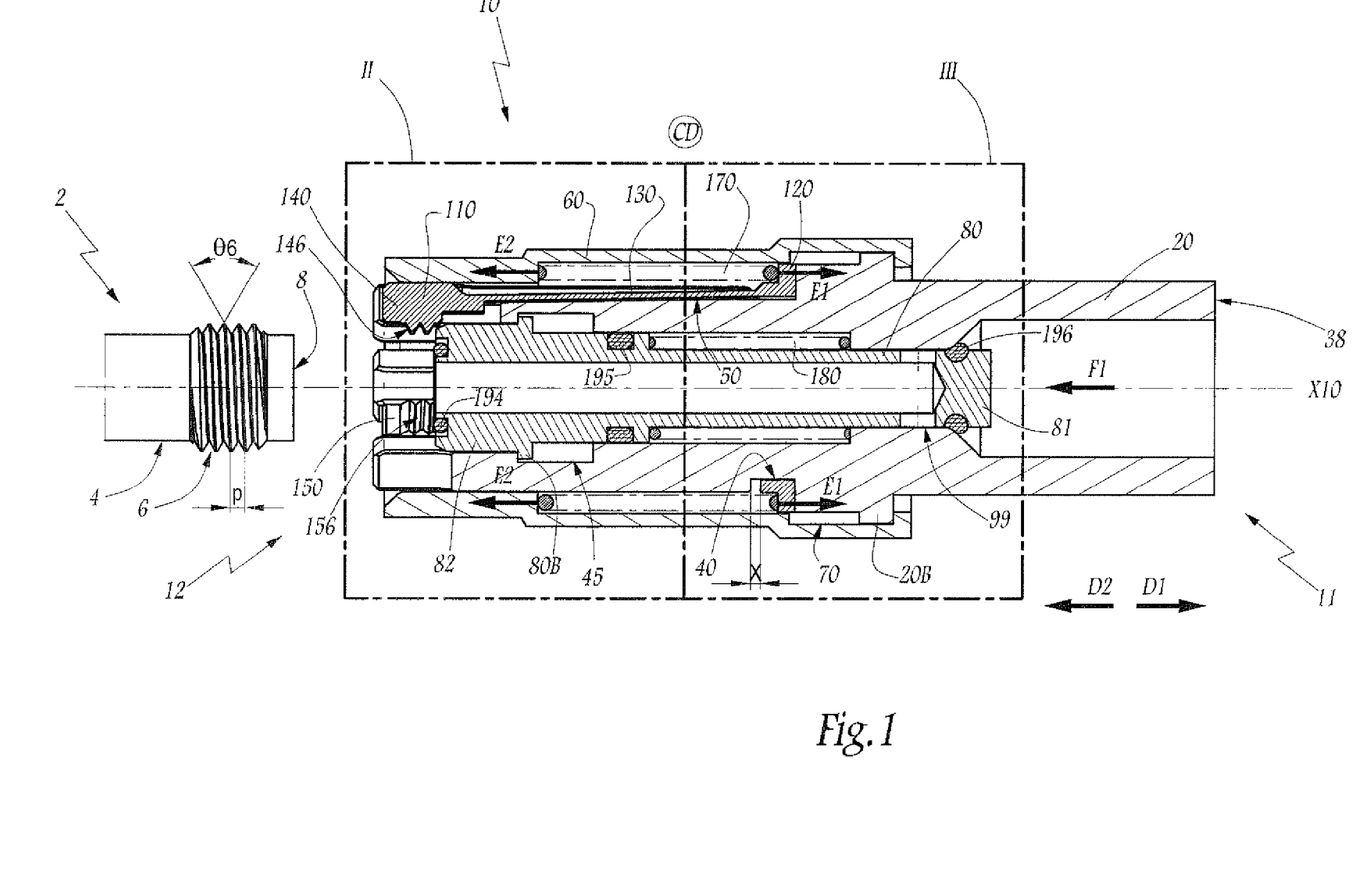
FIG. 1 is an axial cross-section of a connector according to the invention, in the uncoupled configuration, this connector comprising a connecting device according to the invention, configured as a female element and adapted to receive a male end.

As shown in FIGS. 1, 2 and 7, the claw 150 has an engaging profile configured as a tapping portion 156. Likewise, as shown in FIG. 7, the claw 160 has an engaging profile configured as a tapping portion 166. Thus, the tappings 146, 156 and 166 can engage with the complementary threading 6 of the male end 2. More specifically, since the tapping portions 146, 156 and 166 of the claws 140, 150 and 160 do not form a tapping developed 360° around the axis X10, the engaging profile formed by these tapping portions engages on only part of the thread 6, which is enough to lock the device 10 on the male end 2. In practice, the tapping portions 146, 156 and 166 are machined during a same operation to keep the coil of the tapping of the claws 140, 150 and 160 in the locked position.

As shown in FIG. 5, the thread 6 and the tapping 146 have a pitch P and an apical angle θ6 that are respectively identical. The thread 6 has an apical surface 6b connecting a side thread surface 6a facing opposite the surface 8 and a side thread surface 6c facing said surface 8. The thread 6 also has a bottom surface 6d connecting the two opposite side thread surfaces 6a and 6c. Similarly, the tapping 146 has an apical surface 146b connecting a side thread surface 146a facing the side 11 and a side thread surface 146c facing the side 12. The tapping 146 also has a bottom surface 146d connecting the two side surfaces of opposite threads 146a and 146c.

In practice, in complete meshing, i.e. when the device 10 is locked on the male end 2, surfaces 6a and 146a, 6b and 146b, 6c and 146c, 6d and 146d radially face each other, respectively. In particular, surfaces 6a and 146a bear against each other. Surfaces 6b and 146b, considered in a plane including the axis X10, are parallel to each other and to the axis X10 in complete meshing. These surfaces 6b and 146b are housed in the bottom of the opposite thread when the surfaces 6a and 146a bear against each other.

In the uncoupled position of FIGS. 1 to 3, the spring 170 inserted between the locking ring 60 and the annular base 120 exerts a force E1 in direction D1, which tends to space the surfaces 65 and 124 apart and press the rear surface 123 against the surface 42. The claws 140, 150 and 160 are pushed back in abutment in direction D1. At the same time, the ring 60 is pushed back by the spring 170 with a force E2 in direction D2, with the surface 72 of the groove 70 abutting on the front against the surface 22 of the shoulder 20B of the body 20, while the surface 64 covers the surfaces 141 and equivalents with claws.

In that case, the device 10 is configured so that, in the uncoupled configuration CD, the axial play X between the surfaces 43 and 126 is greater than or equal to the half-pitch P/2 of the threads 6 and 146.

Furthermore, the sole spring 170 is adapted to reliabilize the relative movement of the different elements of the device 10, as detailed below, while reducing the radial compactness of the device 10.

In an alternative that is not shown, the spring 170 can be replaced by two springs, a first spring being arranged between the body 20 and the ring 60 to axially push said ring 60 in direction D2, the second spring being provided between the body 20 and the claws 140, 150 and 160 to axially push said claws in direction D1.

When the operator handles the device 10 for coupling, he slides the ring 60 in direction D1, against the force E2, his fingers being positioned on the surface 61 and the body 20. The surface 64 slides on the surface 141 and exposes it, then the surface 63 slides on the surface 142, these being inclined by angles α1 and α2, respectively.

As visible in FIG. 4, the claws 140, 150 and 160 are then freed by the ring 60 and open elastically while moving away from axis X10 to free the passage for the male end 2 in direction D1.

Then, while keeping the ring 60 in the withdrawn position on the rear side 11, the operator brings the device 10 closer to the male end 2 along the axis X10, until the surface 8 of the male end 2 abuts against the end 82 of the piston 80, which moves against the action of the spring 180 and forms an elastic stop. The sealing is then ensured between the surfaces 8 and 92 owing to the frontal joint 194.

By bringing the device 10 and the end 2 even closer together, the operator makes the piston 80 slide in the body 20 in direction D1, against the action of the spring 180. The piston 80 can slide until its shoulder 80B abuts in the groove 45, with the surface 86 bearing against the surface 47. In that configuration, the end 81 configured as a valve is separated from its seat while moving away from the surface 32. The O-ring 196 no longer bears against the edge 36, the openings 97 and 98 communicate with the inside of the bore 31 and the flow of fluid F1 can pass toward the male end 2 following flows F2, F3, F4 and F5. The O-rings 194 and 195 then ensure sealing in the connector R10.

At this stage, while the tapping portions 146 and similar elements are positioned facing the thread 6, the operator releases the locking ring 60. Alternatively, optionally, the operator can accompany the movement of the ring 60 in direction D2.

As shown in FIGS. 4 and 6, illustrating the operation of the device 10 during coupling and in the coupled configuration CA, respectively, the ring 60 is pushed back by the force E2 generated by the spring 170 toward the claws 140, 150 and 160 and tends to receive them. Each claw 140, 150 and 160 then undergoes a radial bending force oriented toward the axis X10, with the surface 63 that presses on the surfaces 142. In FIG. 6, the parts 130 are deformed and the claws 140, 150 and 160 come closer to the outer surface 4 of the male end 2. More specifically, the thread portions 146 and similar elements come into contact with the thread 6, i.e. the complementary engaging profiles come into contact.

For simplification purposes, only the claw 140 and the tapping portion 146 are mentioned below. It is, however, to be understood that the claws 150 and 160 behave similarly.

Different cases can then arise, when the tapping 146 bears on the thread 6, to lock the claw 140, on the male end 2, as illustrated in reference to FIG. 5.

If the thread 6 and the tapping 146 are henceforth perfectly aligned, they mesh completely and the locking is done. More specifically, the thread apices 6a and 146b must be radially aligned with the bottoms 146d and 6d of the corresponding threads, and the surfaces 6a and 146a bear against each other when the claw 140 is brought closer to the axis X10. However, it will be noted that this case is relatively rare.

If the surface 146c comes into contact with the surface 6c, the tapping 146 tends to align and mesh completely with the thread 6, while pushing the male end 2 back in direction D2. In that case, the piston 80 slides slightly in direction D2, the surfaces 8 and 92 continue to bear and the sealing is maintained at the end 82 formed in an elastic stop.

If the apex 146b comes into contact with the apex 6b, the male end 2 being pushed by the piston 80, once the apex 146b leaves contact with the apex 6b, the tapping 146 can be housed in the thread 6 according to the case previously described, in which the contact initially takes place between the surfaces 6c and 146c.

However, if as illustrated in FIG. 5, the surface 146a of the tapping 146 bears on the surface 6a of the thread 6, at an axial distance Y from the closest aligned position of the tapping 146 with the thread 6, the claw 140 must be moved by that distance Y in direction D2 to result in complete meshing. To that end, the action of the ring 60 and the action of the thread 6 on the claw 140 move said claw 140, on the one hand, radially toward the male element 2 and, on the other hand, with the contact interface 60/140 inclined at 45°, therefore smaller than the apical angle of the thread, which is equal to 60°, axially in direction D2, i.e. against the force E1 exerted by the spring 170.

In practice, this movement, which is simultaneously radial and axial, of the claw 140 follows from the presence of the axial play X, as well as the configuration of the contact interface 60/140 defined by the surfaces 63 and 142. The play X, defined on the front of the annular base 120 in the housing 40 in the uncoupled configuration CD, is greater than or equal to the half-pitch P/2 of the thread 6, so that each claw 140 and similar element can be moved in direction D2 by max X for complete meshing of the threads 6 and 146. The surfaces 63 and 142 are inclined at 45° along angles α1 and α2, this incline being smaller than the apical angle θ6 of the thread 6, which is equal to 60° to cause the axial movement of the coupling member 110.

When the meshing between each claw 140, 150 and 160 and the thread 6 of the male end 2 is complete, the claws 140, 150 and 160 are in the locked position on the end 2, bent toward the axis X10 via deformable parts 130, engaged with the thread 6 and radially surrounded by the locking ring 60, which keeps them in the locked position, with the surface 64 that covers the surfaces 141 and similar elements.

At this stage, if axial play X remains between the surfaces 126 and 43, for example if the claws 140, 150 and 160 have been moved on the front with Y<(strictly less than) X, then the assembly comprising the coupling member 110, the male end 2 and the piston 80 is pushed back by the spring 180 and the fluid pressure in direction D2, until the surface 126 of the annular base 120 is positioned abutting on the front against the surface 43 of the groove 40. Any separating movement between the male end 2 and the device 10 is prevented, and the coupled configuration CA of the connector R10 thus obtained has significant reliability.

In this configuration, the initial play X is moved to form an axial play X2 on the rear between the surfaces 42 and 123. Furthermore, it will be noted that the movement of the elastic stop formed by the end 82 of the piston 80 guarantees sealing of the connector R10, irrespective of the relative movement of the coupling member 110 relative to the body 20.

In any case, between the uncoupled configuration CD and the coupled configuration CA with fluid circulation, the axial position of the coupling member 110 relative to the body 20 has been moved in direction D2 by value X. This possibility of moving the coupling member 110 ensures its adaptation to the relative position of the thread 6 of the male end 2.

In order to uncouple the connector R10, the operator pulls the ring 60 backward against the spring 170: the claws are released and can come out of the thread 6, leaving a passage for the end 2 in direction D2. As soon as the claws are released, the coupling member 110 is pushed to abut on its rear by the spring 170, with formation of the axial play X on the front of the base 120, in preparation for a new coupling.

In an alternative that is not shown, the claws 140, 150 and 160 can be independent of one another, each provided with a base 120 specific to it. In that case, the bases 120 can be attached by an auxiliary member, such as the member referenced 16 in EP-A-0 804 701, which maintains their cohesion and allows their coordinated axial movement in the housing 40.

According to another alternative that is not shown, the elastic means, such as the spring 170, act on the coupling member 110 via an intermediate piece. For example, the elastic means exert an axial force on an annular washer, which is arranged bearing on its rear face, i.e. facing the side 11, on the bases of three independent claws.

Figures 8, 9:
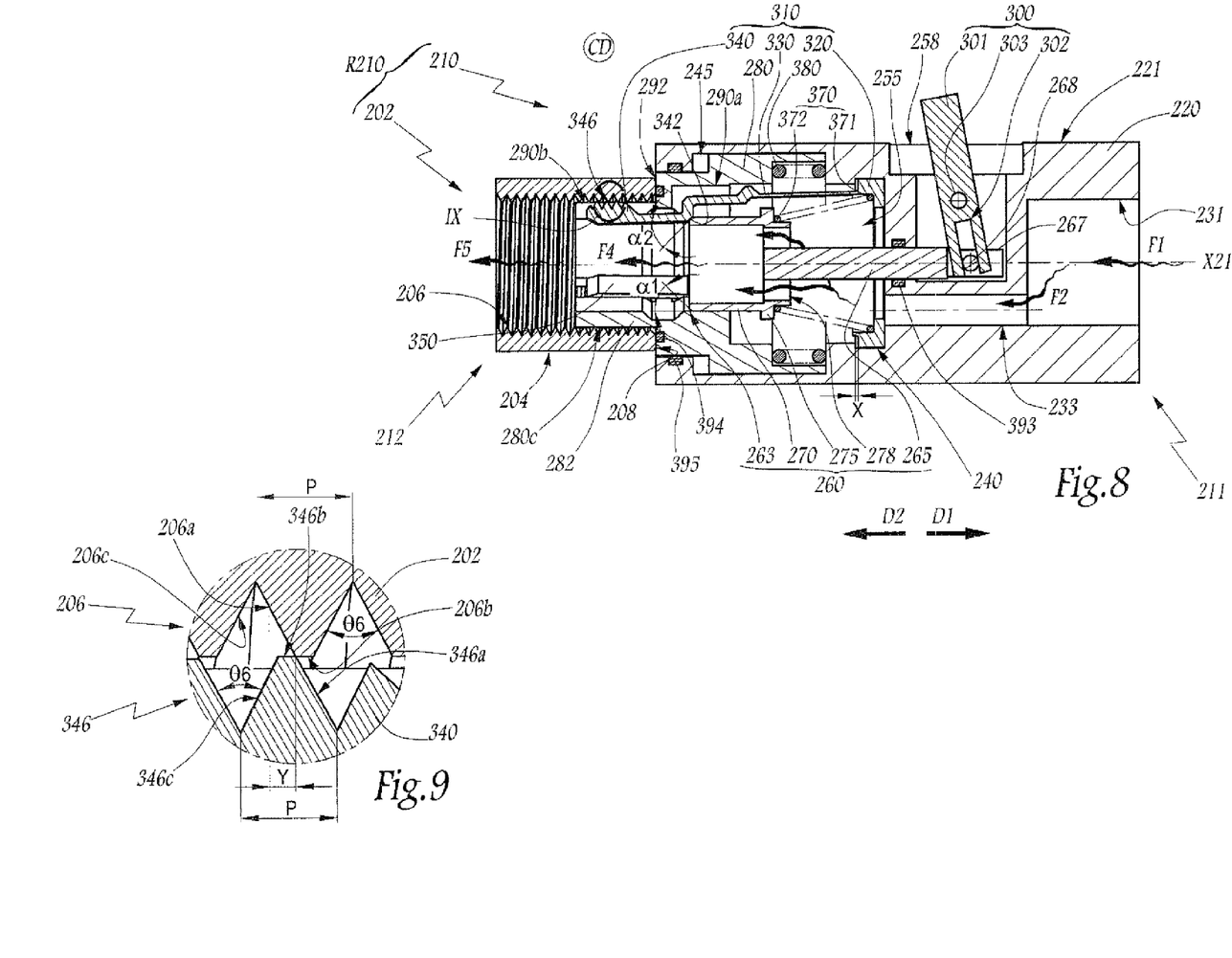
FIG. 8 is a cross-section, similar to FIG. 4, of a second embodiment of a connector according to the invention, this connector comprising a connecting device according to the invention, configured as a male element and adapted to cooperate with a female end.
FIG. 9 is a larger-scale view of detail IX in FIG. 8, showing the complementary threads of the female end and the connecting device.
Figure 10:
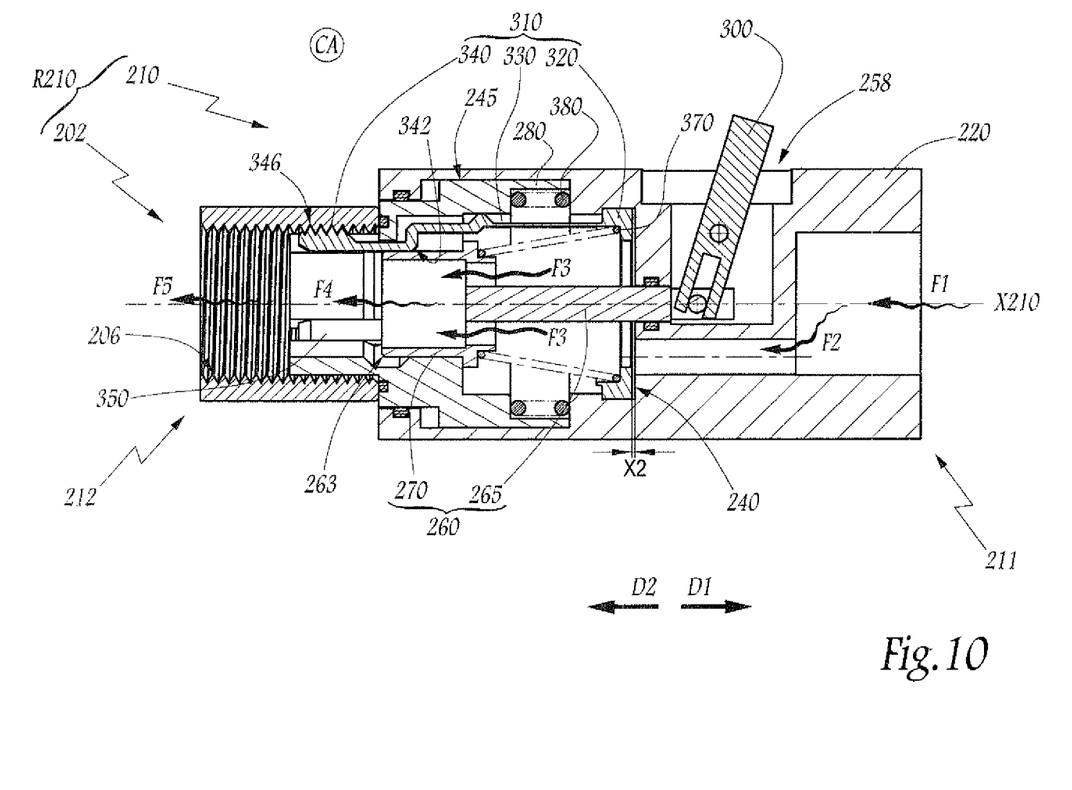
FIG. 10 is a cross-section similar to FIG. 6, showing the female end and the connecting device in a coupled configuration.

FIGS. 8 to 10 show a second embodiment of a connecting device 210 according to the invention.

Compared with the device 10 of the first embodiment, the differences relate to essentially structural, not functional, aspects. In fact, the operation of the device 210 is similar to the device 10, to form a connector R210 by coupling with a connecting end 202. However, in that case, the device 210 is configured as a male element, while the end 202 is configured as a female element.

Certain component elements of the connecting device 210 are comparable to the component elements of the device 10 of the first embodiment, described above, and bear the same references increased by 200. These are the longitudinal axis X210, the sides 211 and 212, directions D1 and D2, the tubular body 220, the annular groves 240 and 245, the control member 260, the support surface 263, the piston 280 with its end 282 configured as an elastic stop, the coupling member 310 provided with an annular base 320 connected by deformable parts 330 to the claws 340, 350 and 360, the latter not being shown, the tapered surface 342, angles α1 and α2, the thread portion 346 including surfaces 346a, 346b and 346c, the spring 370 including ends 371 and 372, the spring 380, the O-rings 394 and 395, the flows F1, F2, F3, F4 and F5, as well as the axial plays X and X2.

In practice, the control member 260 has a different structure from the control member 60 of the first embodiment, which is configured as an outer ring. In fact, the member 260 is slidingly mounted along the axis X210 inside the body 220 and can be actuated using a lever 300.

The female end 202, positioned centered along the axis X210 of the device 210 on the side 212 before coupling, has a cylindrical outer surface 204 and a tapped inner surface 206, which extend parallel along the axis X210. The end 202 has an end surface 208 that extends radially between the surfaces 204 and 206 on the side facing the device 210.

More specifically, the tapping 206 has a metric thread with an apical angle θ6 equal to 60° and a pitch P, as shown in FIG. 9. The tapping 206 has an apical surface 206b connecting a side thread surface 206a facing opposite the surface 208 and a side thread surface 206c facing toward the surface 208. At the bottom of the tapping 206 facing toward the axis X210, the two opposite side thread surfaces 206a and 206c are directly connected.

Similarly, the thread portion 346 of the claw 340 has an apical surface 346b connecting a side thread surface 346a facing toward the side 211 and a side thread surface 346c facing toward the side 212. At the bottom of the thread 346 facing opposite the axis X210, the two opposite side thread surfaces 346a and 346c are directly connected.

The body 220 has a cylindrical outer surface 221, which extends parallel to the axis X210 from the side 211 to the side 212. An opening 258 is formed in the body 220 from the surface 221. This opening 258 is provided to arrange the lever 300 in the body 220.

The body 220 has an inner bore 231 in which the flow F1 penetrates the device 210, as well as a cylindrical conduit 233 in which the flow F2 flows to a chamber 255 defined by the elements 260, 280 and 310. Furthermore, the elements 370 and 380 are inserted between the elements 260, 280 and 310 in that chamber 255.

The piston 280 is arranged in the groove 245 of the body 220, and can slide axially against the action of the spring 380 or be accompanied there by said spring 380. Axial grooves 290a and 290b are formed in the piston 280, for positioning of the claws 340, 350 and 360. The end 282 of the piston 280 has an annular portion 280C, provided to penetrate the female end 202. Also, the frontal O-ring 394 is arranged in the piston 280 at the radial surface 292.

The control member 260 has a shaft 265 that is attached to a tubular ring 270 of the side 212 and that is attached to the lever 300 of the side 211. The ring 270 has a shoulder 275 protruding outwardly relative to the axis X210, so that the spring 370 is pressed on side 212 against the shoulder 275 and on side 211 against the annular base 320. This spring 370 is a conical spring, with one end 372 that pushes the abutting member 260 forward and one end 371 that pushes the abutting member 310 backward. Between the ring 270 and the shaft 265, openings 278 are provided for the flow F3 to flow inside the chamber 255 toward the inside of the ring 270. On side 211, opposite the ring 270, the shaft 265 has an axial groove 267 in which a pin 268 is housed. An O-ring 393 is positioned in the body 220 around the ring 265, so as to achieve sealing between the opening 258 and the chamber 255.

The lever 300 has a handling shaft 301, a groove 302 and a hinge 303 that forms a pivot link of the lever 300 relative to the body 220. The pin 268 is arranged in the groove 302, so that rotating the lever 300 around the hinge 303 axially moves the shaft 265, along the axis X210.

By moving the shaft 301 in direction D2, the operator can slide the member 260 in direction D1 while opposing the action of the spring 370, reveal the claw 340 to allow the radial elastic movement thereof toward the axis X210, so as to position the female end 202 against the piston 280. More specifically, the tapped surface 206 surrounds the annular part 280C belonging to the end 282 of the piston 280, while the surface 208 bears against the surface 292. The tapping 206 faces the thread 346 of the claw 340, which is axially mobile on the front.

Then, by moving the shaft 301 in direction D1 or allowing the end 372 of the spring 370 to act on the ring 270 and push it forward, the operator can slide the control member 260 in direction D2, actuate the coupling member 310 under the thrust from the ring 270, and thus move the claw 340 away radially, spacing it away from the axis X210, so that the thread portion 346 comes into contact with the tapping 206 of the female end 202.

As in the device 10 of the first embodiment, the surface 342 of the claw 340 is inclined by an angle α2 in the locked position so that the surface 342 cooperates, during coupling, with the surface 263 of the ring 270 that is inclined by an angle α1. Preferably, the angles α1 and α2 are equal to 45°, so that the contact interfaces 270/340 between the ring 270 and the claw 340 is inclined by an angle substantially equal to 45° smaller than the apical angle θ2, which is equal to 60°.

In an alternative that is not shown, only one element among the ring 270 and the claw 340 has an inclined surface 263 or 342. In that case, the contact interface 270/340 is defined by said inclined surface 263 or 342.

In the uncoupled configuration CD, as shown in FIG. 8, the axial play X is provided on the front of the annular base 320 in the groove 240. When the claw 340 comes into contact with the tapping 206, if the contact occurs on a surface 206a of the tapping 206, the claw 340 has a possibility of axial movement by max X, toward the female end 202 and against the spring 370, for complete meshing and automatic locking of the claws.

In the coupled configuration CA, as shown in FIG. 10, the ring 270 covers the claw 340, on the side facing the axis X210, to keep the claw 340 in the locked position on the tapping 206. The spring 380 and the pressure of the circulating fluid cause the base 320 to abut on the front against the body 220, i.e. the initial play X is moved to form axial play X2 on the rear of the base 320 in the groove 340.

In this way, the claw 340 can be moved radially and axially, owing on the one hand to the presence of the axial play X, and on the other hand to the configuration of the contact interface 270/340 relative to the geometry of the threads 346 and 206.

In an alternative that is not shown, the claws 340, 350 and 360 can be independent of each other, each provided with a base 320 specific to it. In that case, the bases 320 can be attached by an auxiliary member, which maintains their cohesion and allows their coordinated movement in the groove 240.

The invention claimed is:

1. A connecting device adapted to transmit pressurized gaseous and/or liquid fluids, the connecting device being configured to be coupled with a connecting end provided with an engaging profile, with a first element among the connecting device and the connecting end that is configured as a male element and a second element among the connecting device and the connecting end that is configured as a female element, the connecting device comprising:
   a tubular body that extends along a longitudinal axis between a front side facing the connecting end in the coupled configuration and a rear side facing opposite the connecting end in the coupled configuration,
   a control member that slides relative to the tubular body along the longitudinal axis, at least one coupling member that includes an engaging profile complementary to the engaging profile of the connecting end, and wherein the engaging profile of the at least one coupling member and the engaging profile of the connecting end are complementary threads and tappings which have an identical apical angle and thread pitch and wherein the axial play is greater than or equal to a half-pitch of the threads and tappings, and
   elastically deformable means that push the control member back toward the front side in a maintenance position of the a least one coupling member locked on the connecting end and which push the at least one coupling member back toward the rear side against a surface of the tubular body in a position, when a passage for the connecting end is freed by the at least one coupling member, where an axial play is defined between the at least one coupling member and the tubular body, the axial play allowing an axial movement of the at least one coupling member relative to the tubular body and against the elastically deformable means acting on the at least one coupling member toward a position locked on the connecting end.

2. The connecting device according claim 1, wherein the connecting device has a contact interface between the control member and the at least one coupling member, the contact interface being inclined relative to the longitudinal axis.

3. The connecting device according to claim 2, wherein the contact interface is defined by a tapered surface of the control member that defines an incline angle relative to the longitudinal axis in a plane including the longitudinal axis, and wherein the incline angle is smaller than or equal to an apical angle of the threads.

4. The connecting device according to claim 1, wherein the connecting device has a contact interface between the control member and the at least one coupling member, this contact interface being inclined relative to the longitudinal axis, wherein the contact interface defines an incline angle relative to the longitudinal axis in a plane including the longitudinal axis, and wherein the incline angle is smaller than or equal to the apical angle of the threads.

5. The connecting device according to claim 1, wherein the at least one coupling member has an elastically deformable part, the deformable part being configured to radially move the engaging profile of the at least one coupling member by deforming.

6. The connecting device according to claim 1, wherein the at least one coupling member includes several claws positioned radially around the longitudinal axis and connected to a substantially annular shared base.

7. The connecting device according to claim 1, wherein the at least one coupling member cooperates with the tubular body via a base arranged in a housing of the tubular body, the axial play being defined between the base and the housing.

8. The connecting device according to claim 1, including a piston sliding in the tubular body, a first end of the piston forms a valve elastically returned on a valve seat formed on the tubular body, and in that a second end of the piston forms an elastic stop that receives the connecting end to produce sealing between the connecting end and the connecting device.

9. The connecting device according to claim 1, wherein the elastically deformable means include a single spring arranged between the control member and the at least one coupling member, the spring pushing the control member back toward the front side toward the maintenance position of the at least one coupling member locked on the connecting end and pushing the at least one coupling member back toward the rear side toward the position where the axial play is defined between the at least one coupling member and the tubular body.

10. The connecting device according to claim 1, wherein the connecting device is configured as a female element adapted to receive a male connecting end, and wherein the control member is an annular ring that slides outside the tubular body.

11. A connector for transmitting gaseous and/or liquid fluids at high pressure, wherein the connector comprises:
    a connecting device according to claim 1 connected to a first pipe, and
    a connecting end that is coupled to the connecting device and connected to a second pipe.

12. The connecting device according to claim 1, wherein a housing is formed in the tubular body, the housing including a first surface and a second surface facing each other, and wherein the elastically deformable means push the at least one coupling member back toward a rear side against the first surface of the housing in a position where the axial play is defined between the at least one coupling member and the second surface of the housing.

13. A connecting device adapted to transmit pressurized gaseous and/or liquid fluids, the connecting device being configured to be coupled with a connecting end provided with an engaging profile, with a first element among the connecting device and the connecting end that is configured as a male element and a second element among the connecting device and the connecting end that is configured as a female element, the connecting device comprising:

a tubular body that extends along a longitudinal axis between a front side facing the connecting end in the coupled configuration and a rear side facing opposite the connecting end in the coupled configuration, a control member that slides relative to the tubular body along the longitudinal axis, at least one coupling member that includes an engaging profile complementary to the engaging profile of the connecting end, and wherein the at least one coupling member has an elastically deformable part, the deformable part being configured to radially move the engaging profile of the at least one coupling member by deforming, and elastically deformable means that push the control member back toward the front side in a maintenance position of the a least one coupling member locked on the connecting end and which push the at least one coupling member back toward the rear side against a surface of the tubular body in a position, when a passage for the connecting end is freed by the at least one coupling member, where an axial play is defined between the at least one coupling member and the tubular body, the axial play allowing an axial movement of the at least one coupling member relative to the tubular body and against the elastically deformable means acting on the at least one coupling member toward a position locked on the connecting end.

14. A connecting device adapted to transmit pressurized gaseous and/or liquid fluids, the connecting device being configured to be coupled with a connecting end provided with an engaging profile, with a first element among the connecting device and the connecting end that is configured as a male element and a second element among the connecting device and the connecting end that is configured as a female element, the connecting device comprising:

a tubular body that extends along a longitudinal axis between a front side facing the connecting end in the coupled configuration and a rear side facing opposite the connecting end in the coupled configuration, a control member that slides relative to the tubular body along the longitudinal axis, at least one coupling member that includes an engaging profile complementary to the engaging profile of the connecting end, and wherein the at least one coupling member includes several claws positioned radially around the longitudinal axis and connected to a substantially annular shared base, and elastically deformable means that push the control member back toward the front side in a maintenance position of the a least one coupling member locked on the connecting end and which push the at least one coupling member back toward the rear side against a surface of the tubular body in a position, when a passage for the connecting end is freed by the at least one coupling member, where an axial play is defined between the at least one coupling member and the tubular body, the axial play allowing an axial movement of the at least one coupling member relative to the tubular body and against the elastically deformable means acting on the at least one coupling member toward a position locked on the connecting end.

\* \* \* \* \*